United States Patent [19]

Hisamoto et al.

[11] Patent Number: 4,459,221
[45] Date of Patent: Jul. 10, 1984

[54] FLUORINE-CONTAINING SURFACE ACTIVE COMPOSITION

[75] Inventors: Iwao Hisamoto, Osaka; Chiaki Maeda, Kyoto; Mitsuhiro Nishiwaki, Osaka, all of Japan

[73] Assignee: Daikin Kogyo Co., Ltd., Osaka, Japan

[21] Appl. No.: 277,685

[22] Filed: Jun. 26, 1981

[30] Foreign Application Priority Data

Jun. 27, 1980 [JP] Japan .................... 55-88345

[51] Int. Cl.$^3$ .................................. B01F 17/18
[52] U.S. Cl. ........................... 252/356; 204/DIG. 1;
252/3; 252/8.05; 252/5; 252/7; 252/357;
422/42; 430/631; 430/635
[58] Field of Search ............. 252/356, 357, 2, 3,
252/5, 7, 8.05; 422/42

[56] References Cited

U.S. PATENT DOCUMENTS 3,475,333  10/1969  Meldrum et al. ............ 252/3
3,562,156  2/1971   Francen .................... 252/3 X
3,941,705  3/1976   Foulletier et al. ......... 252/8.05
4,069,158  1/1978   Bertoccio et al. .......... 252/3
4,278,552  7/1981   Hisamoto et al. ........... 252/3

Primary Examiner—Richard D. Lovering
Attorney, Agent, or Firm—Birch, Stewart, Kolasch & Birch

[57] ABSTRACT

A fluorine-containing surface active composition capable of reducing the surface tension of water and the interfacial tension between water and oil, which comprises (A) at least one cationic, non-ionic or ampho-ionic surfactant showing a surface tension of not more than 25 dyne/cm when determined on a 0.01 to 1.0% by weight aqueous solution and having at least one fluorine-containing group comprising not less than 6 carbon atoms, of which each carbon atom bears at least one fluorine atom, and (B) at least one of surfactants of the formula:

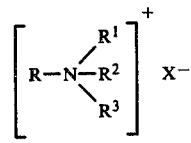

wherein R is a substituted or unsubstituted aliphatic group of 4 to 20 carbon atoms or a substituted or unsubstituted aromatic hydrocarbon group of 6 to 20 carbon atoms, $R^1$, $R^2$ and $R^3$ are each a hydrogen atom, a substituted or unsubstituted aliphatic group of 4 to 20 carbon atoms, a substituted or unsubstituted aromatic hydrocarbon group of 6 to 20 carbon atoms or a fluorine-containing group comprising not more than 5 carbon atoms, of which each carbon atom bears at least one fluorine atom, and $X^-$ is an anion, provided that at least one of $R^1$, $R^2$ and $R^3$ is a fluorine-containing group or, when none of $R^1$, $R^2$ and $R^3$ is fluorine-containing group, $X^-$ is an anion corresponding to the fluorine-containing group.

2 Claims, No Drawings

FLUORINE-CONTAINING SURFACE ACTIVE COMPOSITION

BACKGROUND OF THE INVENTION

The present invention relates to a fluorine-containing surface active composition. More particularly, it relates to a novel fluorine-containing surface active composition which is effective in reducing the surface tension of water as well as the interfacial tension between water and oil.

In general, fluorine-containing compounds can reduce the surface tension of water and are useful as evaporation preventing agents, leveling agents, etc. On the other hand, there are considerable demands for additives for aqueous foam fire-extinguishing agents. Since it is necessary for such fire-extinguishing agents to spread quickly over an oil surface to form an aqueous film, the particular additives are required to have not only a capability of reducing the surface tension of water but also a capability of reducing the interfacial tension between water and oil. Namely, the spreading coefficient (S) has the relationship with the surface tension of oil ($\gamma_o$), the surface tension of water ($\gamma_w$) and the interfacial tension between water and oil ($\gamma_{wo}$) whereby $S = \gamma_o - (\gamma_w + \gamma_{wo})$, and water can spread over the oil surface only when S is positive. Unfortunately, however, the fluorine-containing group in conventional fluorine-containing compounds has only a low affinity to oil so that the satisfactory orientation at the interface between water and oil can not be attained. Thus, conventional fluorine-containing compounds can not sufficiently reduce the interfacial tension between water and oil. In order to supplement such insufficiency, the simultaneous use of a hydrocarbon compound surfactant is necessary.

SUMMARY OF THE INVENTION

As the result of an extensive study, it has now been found that the combined use of at least two kinds of fluorine-containing compounds shows a sufficient capability of reducing the surface tension of water and the interfacial tension of water and oil.

According to the present invention, there is provided a fluorine-containing surface active composition which comprises (A) at least one cationic, non-ionic or amphoionic surfactant showing a surface tension of not more than 25 dyne/cm when determined in a 0.01 to 1.0% by weight aqueous solution and having at least one fluorine-containing group comprising not less than 6 carbon atoms, of which each carbon atom bears at least one fluorine atom, and (B) at leat one surfactant of the formula:

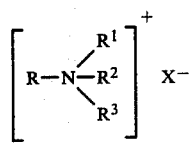

wherein R is a substituted or unsubstituted aliphatic group of 4 to 20 carbon atoms or a substituted or unsubstituted aromatic hydrocarbon group of 6 to 20 carbon atoms, $R^1$, $R^2$ and $R^3$ are each a hydrogen atom, a substituted or unsubstituted aliphatic group of 4 to 20 carbon atoms, a substituted or unsubstituted aromatic hydrocarbon group of 6 to 20 carbon atoms or a fluorine-containing group comprising not more than 5 carbon atoms, of which each carbon atom bears at least one fluorine atom, and $X^-$ is an anion, provided that at least one of $R^1$, $R^2$ and $R^3$ is a fluorine-containing group or, when none of $R^1$, $R^2$ and $R^3$ is a fluorine-containing group, $X^-$ is an anion corresponding to a fluorine-containing group.

The most important structural difference between the surfactants (A) and (B) is the presence of at least one fluorine-containing group having not less than 6 carbon atoms, of which each carbon atom bears at least one fluorine atom, in the surfactant (A) and the presence of at least one fluorine-containing group having not more than 5 carbon atoms, of which each carbon atom bears at least one fluorine atom, in the surfactant (B).

DETAILED DESCRIPTION

The fluorine-containing group in the surfactant (A) is thus characteristic in comprising 6 or more carbon atoms, of which each carbon atom bears at least one fluorine atom. Insofar as the above requirement is met, the fluorine-containing group may be any organic group. In general, however, it is a straight or branched, saturated or unsaturated aliphatic chain comprising 6 to 21 carbon atoms, of which 6 or more carbon atoms bear each at least one fluorine atom, and optionally including not more than 10 hetero atoms chosen from oxygen, sulfur and nitrogen in the chain. The carbon atoms except those having at least one fluorine atom thereon, and the hetero atoms may bear any conventional atom or a group (e.g. hydrogen, chlorine, bromine, iodine, oxygen, lower alkyl). More particularly, it may be, for instance, an optionally-halogenated alkyl or alkenyl group having 6 to 21 carbon atoms, of which 6 or more carbon atoms bear each at least one fluorine atom, and optionally including not more than 10 hetero atoms chosen from oxygen, sulfur and nitrogen at one or more optional place(s) in the chain which constitutes the alkyl or alkenyl group, the hetero atom(s) bearing optionally any conventional atom or group such as hydrogen, halogen, oxygen or lower alkyl.

The fluorine-containing group in the surfactant (B) is characteristic in comprising 5 or less carbon atoms, of which each carbon atom bears at least one fluorine atom. Insofar as the above requirement is met, the fluorine-containing group may be any organic group. In general, however, it is a straight or branched, saturated or unsaturated aliphatic chain comprising 1 to 21 carbon atoms, of which 1 to 5 carbon atoms bear each at least one fluorine atom, and optionally including not more than 10 hetero atoms chosen from oxygen, sulfur and nitrogen in the chain. The carbon atoms except those having at least one fluorine atom thereon, and the hetero atoms may bear any conventional atom or a group (e.g. hydrogen, chlorine, bromine, iodine, oxygen, lower alkyl). More particularly, it may be, for instance, an optionally-halogenated alkyl or alkenyl group having 1 to 21 carbon atoms, of which 1 to 5 carbon atoms bear each at least one fluorine atom, and optionally including not more than 10 hetero atoms chosen from oxygen, sulfur and nitrogen at one or more optional place(s) in the chain which constitutes the alkyl or alkenyl group, the hetero atom(s) bearing optionally any conventional atom or group such as hydrogen, halogen, oxygen or lower alkyl.

The alkylene portion which does not have any fluorine atom in the fluorine-containing group in the surfactant (A) or (B) may be represented by —CHY)$_x$ or $$\text{-(CH}_2\text{CH)}_{\overline{x}}$$
$$|$$
$$\text{CH}_3$$

(wherein Y is hydrogen or halogen other than fluorine and x is an integer of 1 to 3), and the fluorine-containing group may include one or more of such alkylene portions.

Specific examples of the anion X$^-$ are anions of halide, hydroxylate, carboxylate, sulfonate, sulfate, sulfite, phosphate, carbonate, nitrate, etc. These anions may bear any organic group such as alkyl, aryl or aralkyl, particularly a fluorine-containing group having not more than 5 carbon atoms. Thus, the anion X$^-$ can be alkylsulfate, alkylsulfite, alkoxylate, phenoxide, fluoroalkylcarboxylate, etc.

Among various surfactants (A), particularly preferred are quaternary ammonium cationic surfactants, of which typical examples are those of the formula:

$$[R_f-(CH_2)_n-\overset{OR^7}{\underset{}{\text{CHCH}_2}}-\overset{R^4}{\underset{R^6}{N}}-R^5]^+X^-$$

wherein $R_f$ is a fluorine-containing aliphatic hydrocarbon or polyether group, $R^4$, $R^5$ and $R^6$ are each an alkyl, hydroxyalkyl or alkenyl group or a substituted or unsubstituted aryl or aralkyl group, $R^7$ is a hydrogen atom or an acyl group, X$^-$ is an anion and n is an integer of 1 to 3.

The fluorine-containing aliphatic hydrocarbon group repesented by $R_f$ may be a straight or branched, saturated or unsaturated one, usually having not more than 21 carbon atoms. The fluorine-containing aliphatic polyether group represented by $R_f$ has usually not more than 20 carbon atoms and may be the one of the formula:

$$R_f'-O(CFX'CF_2O)_m CFX'CF_2OCF-$$
$$|$$
$$CF_3$$

wherein $R_f'$ is a $C_1$—$C_3$ perfluoroalkyl group, X' is a fluorine atom or a trifluoromethyl group and m is an integer of 0 to 4.

The substituents represented by $R^4$, $R^5$ and $R^6$ may be straight or branched ones having not more than 21 carbon atoms. The acyl group represented by $R^7$ may be the one having not more than 4 carbon atoms (e.g. acetyl, propionyl butyryl).

In the specific formula for the surfactants (B), those wherein R has 8 to 14 carbon atoms, $R^1$, $R^2$ and $R^3$ are each hydrogen or have each 1 to 3 carbon atoms and X$^-$ is a fluorine-containing alkyl carboxylate anion having 2 to 5 carbon atoms are preferred.

The surface active composition of the invention, i.e. the combination of the surfactants (A) and (B) can attain the enhancement of the surface active performances without any deterioration even under high temperatures. Thus, it can always provide a stable aqueous film on an oil surface. The mechanism therefor is presumed as follows: the surfactant (B) having oil-philic groups and fluorine-containing groups in a well balanced relationship serves as an aid for orientation of the surfactant (A), which has excellent surface active characteristics but is low in the affinity to oil, at the interface between water and oil so as to enhance the orientability of the surfactant (A) at the interface between water and oil; simultaneously, the surfactant (B) is hardly transferred to the oil from the surface of water due to its fluorine-containing group in comparison with the case using a conventional hydrocarbon compound surfactant.

Examples of the surfactant (A) are as follows:

Cationic surfactant

No. 1: $[C_8F_{17}SO_2NHC_3H_6N(CH_3)_3]^+I^-$

No. 2: $[C_3F_7O(C_3F_6O)_3\overset{}{\underset{CF_3}{C}}FCONHC_3H_6N(CH_3)_3]^+I^-$ No. 3: $[C_9F_{19}C_2H_4N(CH_3)_3]^+Br^-$ No. 4: $[C_8F_{17}C_2H_4N$ 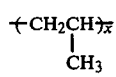 $]^+I^-$ No. 5: $[C_4F_9C_2H_4C_2F_4C_2H_4N$ 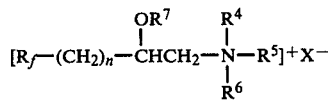 $]^+[CH_3$ 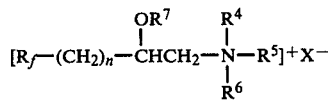 $SO_3]^-$ No. 6: $[C_7F_{15}CONHC_3H_6N(CH_3)_3]_2{}^+SO_4{}^{--}$
No. 7: $[C_9F_{19}CH_2CH(OH)CH_2N(C_2H_5)_2(CH_3)]^+I^-$ Non-ionic surfactant No. 8: $C_7F_{15}CONHC_3H_6N(CH_3)_2 \longrightarrow O$ No. 9: $C_9F_{19}SO_2N(C_2H_5)(C_2H_4O)_{16}H$
No. 10: $C_8F_{17}CH_2O(C_2H_4O)_{10}H$
No. 11: $C_9F_{19}COO(C_2H_4O)_5CH_3$
No. 12: $C_9F_{19}COO(C_2H_4O)_5C_{12}H_{25}$
No. 13: $C_9F_{17}O(C_2H_4O)_{20}C_9F_{17}$ Ampho-ionic surfactant No. 14: $C_7F_{15}CONHC_3H_6\overset{+}{N}(CH_3)_2C_2H_4COO^-$ No. 15: $C_9F_{19}SO_2NHC_3H_6\overset{+}{N}(CH_3)_2C_2H_4COO^-$ No. 16: $C_9F_{19}CH_2CH(OH)CH_2\overset{+}{N}(CH_3)_2C_2H_4COO^-$ No. 17: $C_6F_{13}C_2H_4\overset{+}{N}(CH_2)_2CH_2COO^+$ No. 18: $\left[ C_8F_{17}-\overset{N}{\underset{}{\overset{\|}{C}}}-\text{N}\underset{C_2H_4COONa}{\overset{C_2H_4OH}{\diagup}} \right]^+ \text{OH}^-$ No. 19: $C_8F_{17}NHC_2H_4OSO_3H$ Examples of the surfactant (B) are as follows:

No. 20: $\left[ C_{12}H_{25}-\text{N}\underset{COCF_2CH_3}{\overset{H}{\diagup}\overset{H}{\diagdown}} \right]^+ [\text{OOCCH}_3]^-$ No. 21: 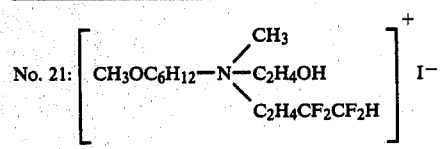

No. 22: 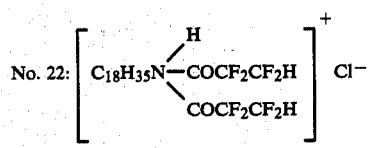

No. 23: 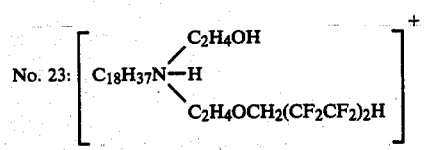

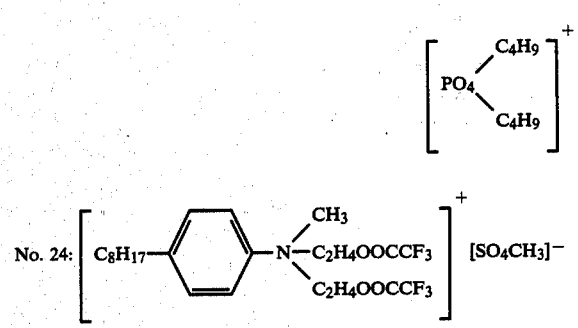

No. 24: 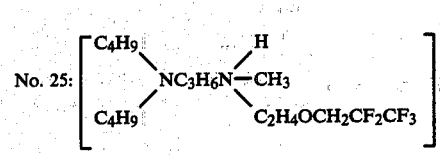

No. 25: 

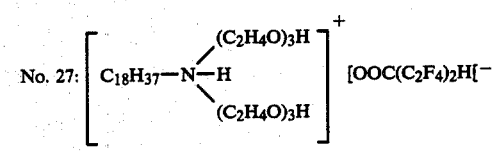

No. 26: $[C_{12}H_{25}-NH_3]^+$ $[OOCCF_2CF_2H]^-$

No. 27: 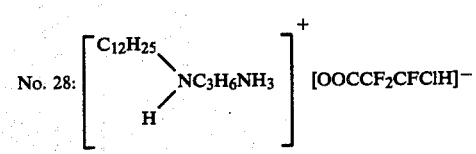

No. 28: 

No. 29: $[C_{18}H_{37}N(CH_3)_3]^+$ $[OOCCF_3]^-$

No. 30: 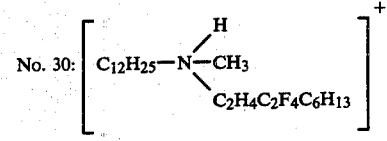

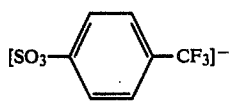

In the fluorine-containing surface active composition of the invention, the weight proportion of the surfactants (A) and (B) is not limitative and may be preferably from 90:10 to 10:90. When the amount of the surfactant (B) is less than the lower limit, the interfacial tension lowering effect is not significant. When the amount is more than the higher limit, the interfacial tension lowering effect is excellent but the surface tension is hardly lowered.

The fluorine-containing surface active composition may comprise only the surfactants (A) and (B) as the active ingredients. When desired, any hydrocarbon compound surfactant may be incorporated into the fluorine-containing surface active composition. Examples of the hydrocarbon compound surfactant are cationic ones (e.g. trialkylammonium halide, benzalkonium chloride), non-ionic ones (e.g. polyoxyethylenealkyl ether, polyoxyethylene fatty acid ester), ampho-ionic ones (e.g. trialkylaminoacetic acid betaine, alkylglycine), etc.

The fluorine-containing surface active composition of the invention is useful as an aqueous film foam fire-extinguishing agent, an additive for protein foam fire-extinguishing agents or synthetic surfactant foam fire-extinguishing agents, a dry chemical fire-extinguishing agent, an evaporation preventing agent, a leveling agent, an additive for photographic emulsions, a mist loss reducing agent for plating baths, etc.

PREFERRED EMBODIMENTS

The present invention will be illustrated more in detail with reference to the following examples wherein part(s) and (%) are by weight.

EXAMPLES 1 TO 6 AND COMPARATIVE EXAMPLES 1 TO 4

Using the surfactant as shown in Table 1, the surface tension of the 0.5% aqueous solution and the interfacial tension between such aqueous solution and n-hexane were measured according to the Wilhelmy method at 25° C. The results are shown in Table 1.

EXAMPLES 7 TO 8 AND COMPARATIVE EXAMPLES 5 TO 8

Into a petri dish having an inner diameter of 60 mm, 30 ml of kerosene or gasoline were charged, and 0.05 ml of the 0.1% aqueous solution of the surfactant as shown in Table 2 was dropped thereon quietly by the use of a microsyringe. By macroscopic observation, it was evaluated whether the dropped solution spreads over the oil surface to make an aqueous film. The results are shown in Table 2 wherein the formation of an aqueous film is indicated by the mark "O", and the non-formation of an aqueous film is indicated by the mark "X".

TABLE 1

| | Surfactant (%) | Surface tension of aqueous solution (dyne/cm) | Interfacial tension between aqueous solution and n-hexane (dyne/cm) |
|---|---|---|---|
| Example | | | |
| 1 | Compound No. 7 (70) | 17.2 | 1.1 |
| | Compound No. 26 (30) | | |
| 2 | Compound No. 7 (80) | 17.3 | 1.4 |
| | Compound No. 29 (20) | | |
| 3 | Compound No. 15 (90) | 17.8 | 2.0 |
| | Compound No. 20 (10) | | |
| 4 | Compound No. 15 (80) | 17.9 | 2.2 |
| | Compound No. 22 (20) | | |
| 5 | Compound No. 9 (70) | 19.5 | 2.8 |
| | Compound No. 21 (30) | | |
| 6 | Compound No. 9 (90) | 19.2 | 3.5 |
| | Compound No. 24 (10) | | |
| Comparative Example | | | |
| 1* | — | 72.0 | 51.3 |
| 2 | Compound No. 7 (100) | 17.0 | 5.0 |
| 3 | Compound No. 15 (100) | 17.4 | 7.6 |
| 4 | Compound No. 9 (100) | 19.0 | 8.2 |

Note:
*no surfactant used.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. A fluorine-containing surface active composition consisting essentially of from 10 to 90 parts by weight of (A) a surfactant of the formula:

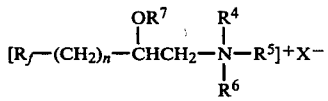

wherein $R_f$ is a fluorine-containing aliphatic hydrocarbon or polyether group comprising not less than 6 carbon atoms, of which each carbon atom bears at least one fluorine atom, $R^4$, $R^5$ and $R^6$ are each an alkyl, hydroxyalkyl or alkenyl group or a substituted or unsubstituted aryl or aralkyl group, $R^7$ is a hydrogen atom or an acyl group, $X^-$ is an anion and n is an integer of 1 to 3, and from 90 to 10 parts by weight of (B) at least one surfactant of the formula:

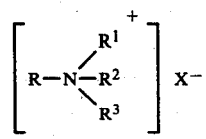

wherein R is a substituted or unsubstituted aliphatic group of 4 to 20 carbon atoms or a substituted or unsubstituted aromatic hydrocarbon group of 6 to 20 carbon atoms, $R^1$, $R^2$ and $R^3$ are each a hydrogen atom, a sub-

TABLE 2

| | Surfactant (%) | | Kerosene | Gasoline |
|---|---|---|---|---|
| Example 7 | $[C_9F_{19}CH_2CH(OH)CH_2N^+(C_2H_5)(CH_3)(C_2H_5)]$ $I^-$ | (70) | O | O |
| Example 8 | $[C_{12}H_{25}NH_3]^+ [OOCCF_2CF_2H]^-$ | (30) | O | O |
| | $[C_6F_{13}C_2H_4N(CH_3)_3]^+ I^-$ | (70) | | |
| | $[C_{12}H_{25}NH_3]^+ [OOCC_5F_{11}]^-$ | (30) | | |
| Comparative Example 5 | $[C_9F_{19}CH_2CH(OH)CH_2N^+(C_2H_5)(CH_3)(C_2H_5)]$ $I^-$ | (100) | O | X |
| Comparative Example 6 | $[C_9F_{19}CH_2CH(OH)CH_2N^+(C_2H_5)(CH_3)(C_2H_5)]$ $I^-$ | (70) | O | X |
| Comparative Example 7 | $C_{12}H_{25}NH_2$ | (30) | O | X |
| | $[C_6F_{13}C_2H_4N(CH_3)_3]^+ I^-$ | (70) | | |
| Comparative Example 8 | $[C_{12}H_{25}NH_3]^+ [OOCC_6F_{13}]^-$ | (30) | X | X |
| | $[C_5F_{11}C_2H_4N(CH_3)_3]^+ I^-$ | (70) | | |
| | $[C_{12}H_{25}NH_3]^+ [OOCC_5F_{11}]^-$ | (30) | | | stituted or unsubstituted aliphatic group of 4 to 20 carbon atoms, a substituted or unsubstituted aromatic hydrocarbon group of 6 to 20 carbon atoms or a fluorine-containing group comprising not more than 5 carbon atoms, of which each carbon atom bears at least one fluorine atom, and $X^-$ is an anion, provided that at least one of $R^1$, $R^2$ and $R^3$ is a fluorine-containing group or, when none of $R^1$, $R^2$ and $R^3$ is the fluorine-containing Group, $X^-$ is a fluorine-containing anion corresponding to the fluorine-containing group.

2. A fluorine-containing surface active composition consisting essentially of from 10 to 90 parts by weight of (A) at least one surfactant selected from the group consisting of cationic, non-ionic, and ampho-ionic surfactants showing a surface tension of not more than 25 dyne/cm when determined in a 0.01 to 1.0% by weight aqueous solution and having at least one fluorine-containing group comprising not less than 6 carbon atoms, of which each carbon atom bears at least one fluorine atom, and from 90 to 10 parts by weight of (B) at least one surfactant of the formula:

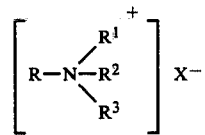

wherein R is a substituted or unsubstituted aliphatic group of 8–14 carbon atoms or a substituted or unsubstituted aromatic hydrocarbon group of 8 to 14 carbon atoms, $R^1$, $R^2$ and $R^3$ are each hydrogen each as substituted or unsubstituted aliphatic group of 1 to 3 carbon atoms and $X^-$ is a fluorine-containing alkyl carboxylate anion having 2 to 5 carbon atoms.

* * * * *